United States Patent [19]

Weber

[11] Patent Number: 4,838,777

[45] Date of Patent: Jun. 13, 1989

[54] EXTRUSION EQUIPMENT FOR COATING WIRE

[75] Inventor: Kurt J. Weber, Préverenges, Switzerland

[73] Assignee: Maillefer SA, Switzerland

[21] Appl. No.: 193,578

[22] Filed: May 13, 1988

[30] Foreign Application Priority Data

May 29, 1987 [CH] Switzerland ............ 2065/87

[51] Int. Cl.⁴ .............................. B29C 47/02
[52] U.S. Cl. ................................. 425/114; 264/40.7; 264/174; 425/113; 425/192 R; 425/400; 425/466
[58] Field of Search ............ 425/113, 114, 468, 400, 425/466, 398; 264/174, 40.7

[56] References Cited

U.S. PATENT DOCUMENTS

| | | | |
|---|---|---|---|
| 4,081,232 | 3/1978 | Pemberton et al. | 425/463 |
| 4,365,949 | 12/1982 | Nash | 425/463 |
| 4,454,804 | 6/1984 | McCulloch | 425/208 |
| 4,512,944 | 4/1985 | Astfalk et al. | 264/174 |
| 4,525,131 | 6/1985 | Hauser, Jr. | 425/114 |
| 4,710,114 | 12/1987 | Garner | 425/110 |

Primary Examiner—Jay H. Woo
Assistant Examiner—Khanh P. Nguyen
Attorney, Agent, or Firm—Oliff & Berridge

[57] ABSTRACT

A die-base ring (11) has at its upstream end a tubular ring (12) provided with a collar (12a) and co-operating with means for fixing the ring to a support (1). The fixing device includes four radial screws (19), pressing against a cylindrical bearing surface (13) of the support and making possible a mechanically operated off-centering of the ring relative to the support, and a clamping collar (20) making it possible to place two cylindrical bearing surfaces (14 and 15) in strictly coaxial positions. Axial screws (16) pass through the support with sufficient radial play to allow the adjustment.

9 Claims, 1 Drawing Sheet

EXTRUSION EQUIPMENT FOR COATING WIRE

This invention relates to wire production, and more particularly to extrusion equipment for continuously forming a sheath of plastic material on wire, of the type having a support, a wire guide fixed in the support along one axis of the support, and an assembly of dies intended to convey and calibrate the plastic material.

The production of metal wire provided with an insulating sheath of plastic material requires the starting up of a production line comprising several elements. This starting-up operation is long, difficult, and delicate. One of the difficulties encountered consists in adjusting the extrusion equipment so that the die is in the correct position relative to the wire guide. When the equipment comprises several dies, it is the overall position of the die assembly which must be adjusted. The most frequent arrangement at the present time for an extrusion head is the horizontal arrangement, and in this case the material tends to accumulate under the effect of its own weight in the lower part of the outlet opening, resulting in the risk of the sheath being off-center relative to the wire. To compensate for this tendency, a certain degree of off-centering is adjusted between the die or dies and the wire guide. However, the adjustment of the off-centering is a delicate and tedious operation, for the amount of off-centering suitable for achieving a final position of the sheath coaxial with the wire depends upon numerous parameters. Upon analyzing this situation, it was found that the adjustment operations could be considerably simplified and activated provided that the equipment was designed so that the die assembly could be brought into a position strictly coaxial with the wire guide by means of an operation capable of being carried out rapidly and repetitively, without trial and error.

It is therefore an object of this invention to provide improved extrusion equipment allowing such an operation.

To this end, the extrusion equipment according to the present invention, of the type initially mentioned, further comprises a die-base ring independent of the support, retaining means capable of holding the die assembly in a fixed position relative to the ring, along one axis thereof, holding means capable of fixing the ring relative to the support so that the mentioned axes are parallel, and lateral adjusting means permitting the distance between the axes to be regulated at will and reset.

Preferred embodiments of the invention will now be described in detail with reference to the accompanying drawing, in which.

Figure 1:
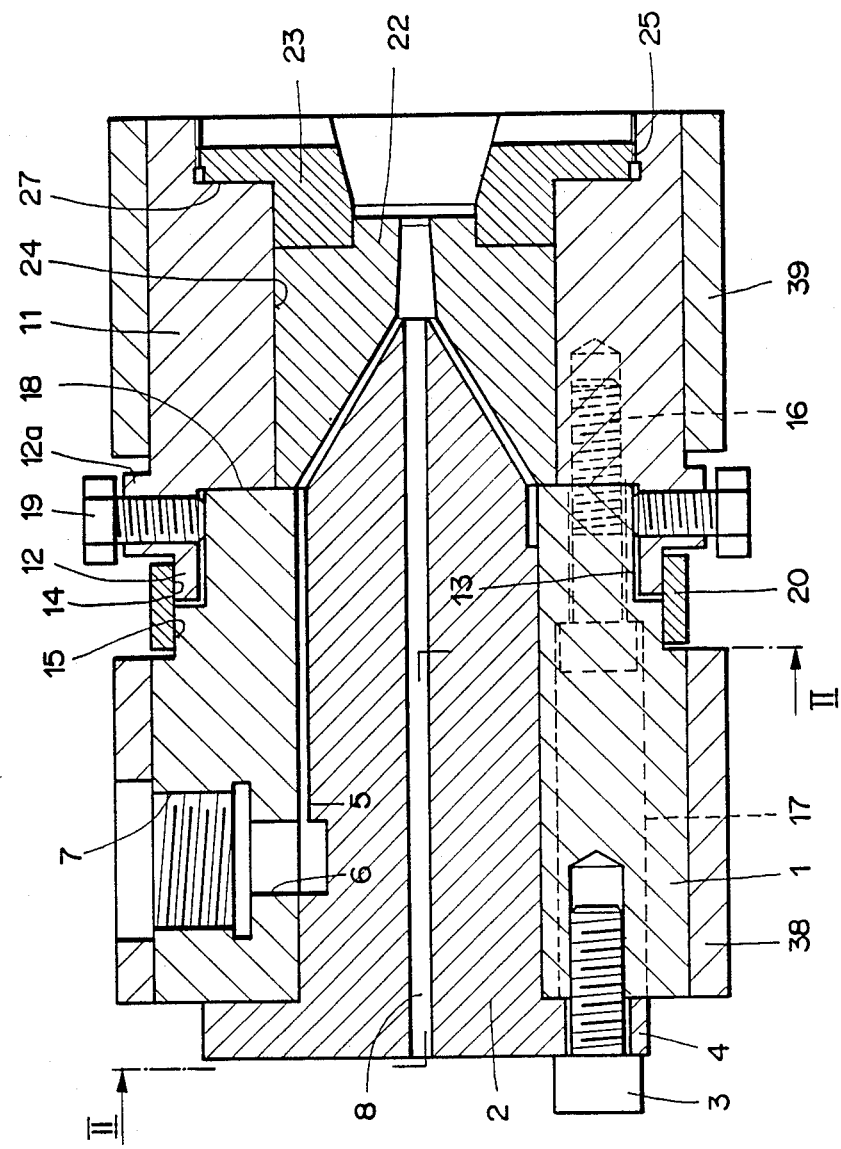
FIG. 1 is an axial section through extrusion equipment in a first embodiment.

The first embodiment relates to extrusion equipment comprising a single feed connection and is intended for extruding an insulating sheath in the form of a layer of plastic onto a metal wire, e.g., an electrical conductor.

The equipment comprises a support 1 which is a tubular part capable of being fixed in a transverse orientation opposite the outlet of an extruder and along the pay-out axis of a metal wire unwinding from a reel, for example. A wire guide 2 is fitted within support 1 and fixed by means of five screws 3 passing through a flange 4 at the rear of wire guide 2. The latter has a cylindrical outer surface matching a bore in support 1 and including a network of channels 5 which receive the plastic material by means of a radial duct 6 passing through support 1 from the bottom of a lateral socket 7. This socket is threaded for receiving a coupling (not shown) connected to the outlet of the extruder. Wire guide 2 has along its longitudinal axis a central passage 8 shaped in such a way as to guide the wire to be coated.

At the front of the extrusion equipment, i.e., at its downstream end, there is a die-base ring 11 having a tubular rim 12 with a collar 12a at its rearward or upstream end. The cylindrical inside surface of rim 12 fits with clearance on a cylindrical outside surface 13 forming a bearing surface at the downstream end of support 1. Tubular rim 12 is further bounded outwardly, at the upstream end, by a cylindrical bearing surface 14 coaxial with ring 11 and having exactly the same diameter as a matching cylindrical bearing surface 15 machined at the downstream end of support 1.

Figure 2:
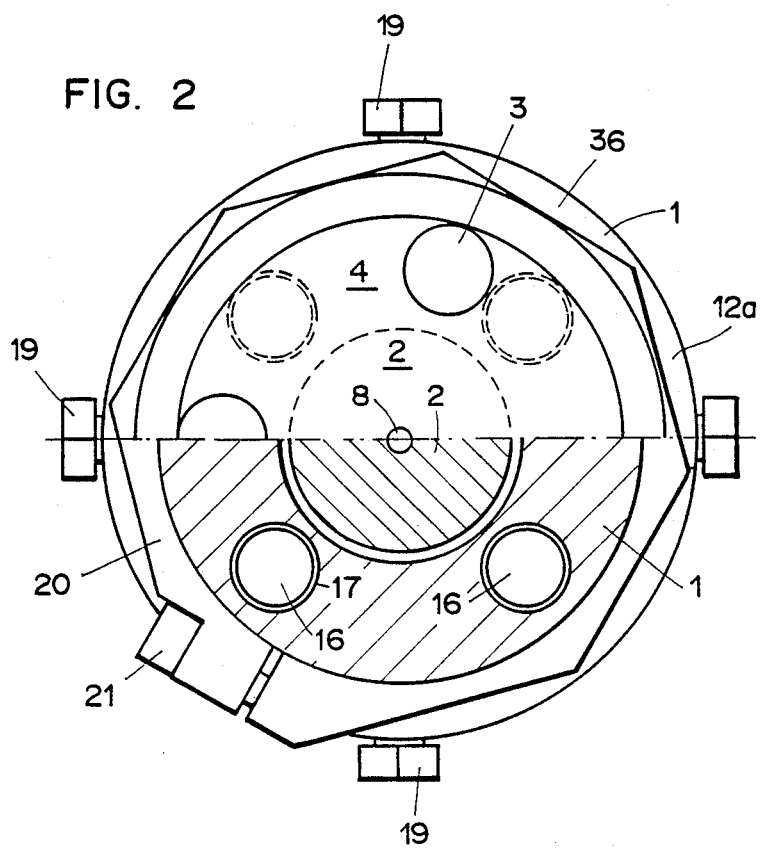
FIG. 2 is an elevation and section on planes perpendicular to the axis of the equipment, taken on the line II—II of FIG. 1.

These elements make it possible to fix ring 11 to support 1 either in a position strictly coaxial with support 1 or with a mechanically operated off-centering. The fixing means used for this purpose comprise, firstly, four screws 16 disposed axially at the bottoms of four holes 17 made in support 1. The axes of these holes are offset angularly relative to those of the threaded holes provided for receiving screws 3. Screws 16 axially press a shoulder 18 of ring 11 against the plane downstream axial face of support 1, the diameters of the holes being sufficient to allow lateral variations of position. Second adjusting means are further provided between ring 11 and support 1. They comprise four screws 19 fitted radially in threaded holes made in collar 12a. The ends of screws 19 press against bearing surface 13; and as the holes into which screws 19 are fitted are oriented at 90° angles from one another in ring 11, these screws make it possible to adjust at will the off-centering of the two constituents of the equipment relative to one another. Finally, a clamping collar 20, capable of being locked or released by means of a screw 21 (FIG. 2) connecting the ends of this collar, allows the two parts 11 and 1 to be placed in positions strictly coaxial with one another when screws 19 are loosened. Clamping collar 20 has a cylindrical inside surface of the same diameter as cylindrical bearing surfaces 14 and 15 so that when screw 21 is tightened, these two bearing surfaces are made strictly contiguous with one another.

Support 1 may be equipped with different die-base rings 11. The ring 11 shown in FIG. 1 bears a die assembly comprising a die 22 of conventional shape, the entry cone of which is situated opposite the frustoconical downstream surface of wire guide 2, and an outer nut 23 fitted to the inside of a bore 24 in ring 11.

The die arrangement described is held in place by nut 23, which screws into a thread 25 made in the inside of a cylindrical recess 27 in ring 11. In an arrangement of this type, it may be necessary to adjust a mechanically operated off-centering between die 22 and wire guide 2; and at the time of such adjustment, it may be useful to effect a forced return to a strictly coaxial position of the two parts. This may be done in a single operation owing to clamping collar 20.

Figure 3:
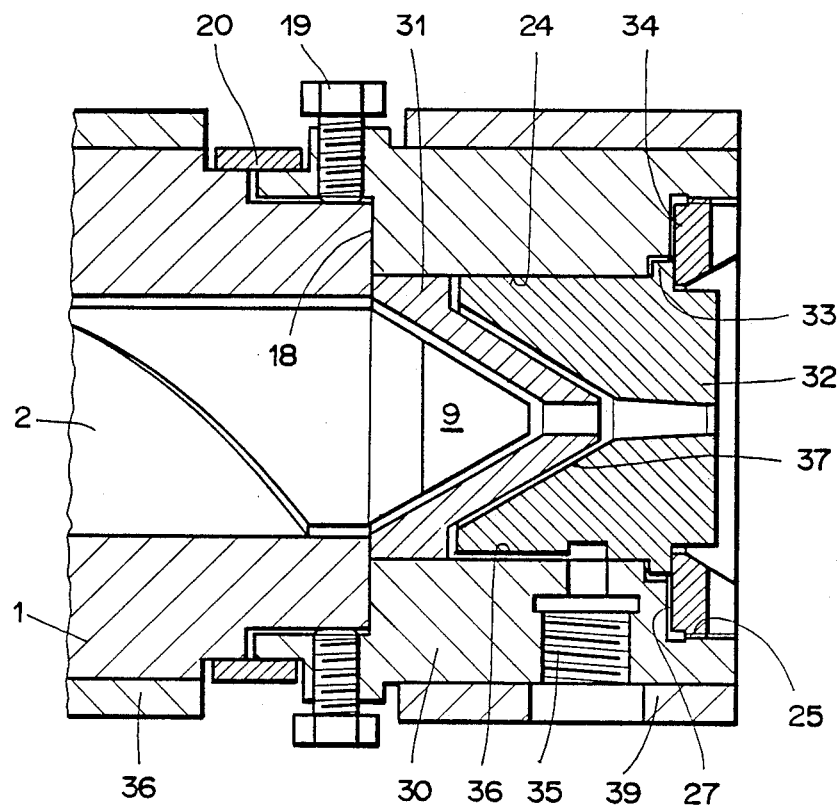
FIG. 3 is a partial section analogous to that of FIG. 1 through a second embodiment of the invention.

However, this die arrangement is not the only one which may be used with the ring 11 described. Thus, FIG. 3 shows another die arrangement held in place in the equipment of the first embodiment. FIG. 3 again shows support 1 and a ring 30 held in place by fixing means 19 and 20 owing to connection means analogous to those of ring 30, formed at its upstream end. Bore 24 of ring 30 guides an upstream 31, the frustoconical upstream surface of which is situated opposite the downstream cone 9 of wire guide 2. A downstream die 32 having a peripheral collar 33 is likewise supported by ring 30. The latter comprises recess 27 with thread 25 into which a nut 34 hooked to collar 33 is screwed. A threaded lateral passage 35 made radially in ring 30 may be connected to a duct coming, for instance, from an auxiliary extruder. It permits feeding a network of secondary ducts 36 made in the outer surface of die 32. Die assembly 31, 32 is held in place by nut 34 pressing against collar 33 of die 32. The plastic material coming from the auxiliary extruder through passage 35 is led through the network of recesses 36 provided in the outer surface of die 32 toward a thin frustoconical chamber 37 made between parts 32 and 31, so that an outer film is deposited on the coating formed on the wire at the outlet of wire guide 2. Passage or socket 7 of support 1 is, in fact, also connected to the main extruder, so that the space between cone 9 of wire guide 2 and space 37 are fed separately. Thus the sheath is formed of a main layer directly coating the wire, and of a film of material of a different constitution, e.g., of colored material, on the surface of the main layer.

Heating jackets 38 and 39 capable of keeping the equipment at the required temperature equip both support 1 and ring 11 or ring 30. As a variation, the die-base ring shown in FIGS. 1 and 3 in two designs 11 and 30, as well as the dies of the various assemblies provided for, might be dimensioned and shaped so that all the die assemblies adapt to a single ring capable of being adjustably fixed to support 1. The latter constitutes the frame of the extrusion head. In the case of a die assembly with auxiliary connection to a feed of plastic material, this connection must have the necessary flexibility to allow the required fitting of the die-base ring relative to support 1. Owing to screws 16, the flat upstream face of the die-base ring is pressed against the flat downstream surface 18 of support 1 so as to prevent any leakage of plastic material between these two surfaces regardless of the lateral fitting of the ring relative to the support.

What is claimed is:

1. Extrusion equipment for continuously forming a sheath of plastic material on wire, comprising:
   a support body having a first longitudinal axis;
   a wire guide within said support body;
   fixing means for fixing said wire guide within said support body coaxially thereto;
   a die-base ring;
   a die assembly insertable within said die-base ring and defining within said ring a second longitudinal axis;
   first positioning means on said support body and on said ring, respectively, for fixing said ring relative to said support body in an adjustable position so that said axes are parallel and located at a predetermined distance from one another; and
   second positioning means for fixing said ring relative to said support body in a predetermined position so that said axes are coincident.

2. The extrusion equipment of claim 1, wherein said ring includes a plurality of tapped holes and a cylindrical bearing surface, said support body including a first cylindrical bearing surface, said ring and said support body each including a respective second cylindrical bearing surface, said first positioning means comprising a plurality of screws fitted radially in said tapped holes of said ring and pressing against said first cylindrical bearing surface of said support body, said second positioning means comprising a cylindrical collar capable of pressing simultaneously against both said second cylindrical bearing surfaces of said ring and of said support body, respectively, said equipment further comprising means for opening and closing said collar.

3. The extrusion equipment of claim 2, wherein said collar includes a cylindrical inside surface, said second bearing surfaces of said support body and of said ring having the same diameter and being outside bearing surfaces.

4. The extrusion equipment of claim 3, wherein said ring comprises a tubular extension including said threaded holes, said first bearing surface being smaller in diameter than said second bearing surfaces and being fitted inside said tubular extension.

5. The extrusion equipment of claim 1, wherein said support body includes a plurality of tapped holes, said ring including a first cylindrical bearing surface, said ring and said support body each including a respective second cylindrical bearing surface, said first positioning means comprising a plurality of screws fitted radially in said tapped holes of said support body and pressing against said first cylindrical bearing surface of said ring, said second positioning means comprising a cylindrical collar capable of pressing simultaneously against both said second cylindrical bearing surfaces of said support and of said ring, respectively, said equipment further comprising means for opening and closing said collar.

6. The extrusion equipment of claim 5, wherein said collar includes a cylindrical inside surface, said second bearing surfaces of said support body and of said ring having the same diameter and being outside bearing surfaces.

7. The extrusion equipment of claim 6, wherein said support body comprises a tubular extension including said threaded holes, said first bearing surface being smaller in diameter than said second bearing surfaces and being fitted inside said tubular extension.

8. The extrusion equipment of claim 1, wherein said die-base ring and said support body include respective plane annular surfaces perpendicular to said axes, said holding means comprising a plurality of screws disposed parallel to said axes and pressing said plane annular surfaces against one another.

9. The extrusion equipment of claim 1, further comprising at least two feed orifices for supplying plastic material permitting the formation of sheathing having distinct zones formed of different materials, at least one of said orifices being provided in said support body and at least one other of said orifices being provided in said die-base ring.

* * * * *